(12) United States Patent
King

(10) Patent No.: US 12,564,177 B2
(45) Date of Patent: Mar. 3, 2026

(54) VARIABLE BUOYANCY PLATFORM FOR AQUACULTURE FARMING AND METHOD OF OPERATING THE SAME

(71) Applicant: 751330 NB Inc., Richibucto-Village (CA)

(72) Inventor: Danny King, Dieppe (CA)

(73) Assignee: 751330 NB Inc., Richibucto-Village (CA)

( * ) Notice: Subject to any disclaimer, the term of this patent is extended or adjusted under 35 U.S.C. 154(b) by 0 days.

(21) Appl. No.: 19/192,889

(22) Filed: Apr. 29, 2025

(65) Prior Publication Data

US 2025/0340274 A1      Nov. 6, 2025

Related U.S. Application Data

(63) Continuation of application No. 19/083,928, filed on Mar. 19, 2025.

(30) Foreign Application Priority Data

Mar. 22, 2024      (CA) ................................ CA 3232915

(51) Int. Cl.
*A01K 61/60*          (2017.01)
*A01K 61/54*          (2017.01)
(Continued)

(52) U.S. Cl.
CPC .............. *A01K 61/60* (2017.01); *A01K 61/54* (2017.01); *B63B 35/44* (2013.01); *B63B 35/607* (2013.01);
(Continued)

(58) Field of Classification Search
CPC ......... B63B 35/34; B63B 35/36; B63B 35/38; B63B 35/44; B63B 77/00; B63B 2207/00;
(Continued)

(56) References Cited

U.S. PATENT DOCUMENTS 2,283,472 A  *  5/1942  Tuxhorn ................ A01K 61/60
47/60
9,730,399 B2    8/2017  Newell
(Continued)

FOREIGN PATENT DOCUMENTS

CA             3119272 A1    11/2022
WO      WO-8900004 A1  *  1/1989  ............. A01K 61/54

OTHER PUBLICATIONS

European Patent Office; Extended European Search Report and Opinion issued in European Patent Application No. 25164215.3 on Sep. 17, 2025; 8 pages.

*Primary Examiner* — Ajay Vasudeva
(74) *Attorney, Agent, or Firm* — Thompson Hine LLP

(57)          ABSTRACT

A variable buoyancy platform including a support frame having a plurality of bottom pontoons fixedly mounted to a bottom side thereof. Each bottom pontoon includes at least an opening disposed in a bottom portion thereof and at least a bottom pontoon air conduit port disposed in a top portion thereof. A plurality of top pontoons are fixedly mounted to a top side of the support frame. Each top pontoon includes at least an opening disposed in a bottom portion thereof and at least a top pontoon air conduit port disposed in a top portion thereof. A bottom air supply conduit system is connected to the at least a bottom pontoon air conduit port of each bottom pontoon. The bottom air supply conduit system includes at least an air supply valve for controlling air flow therethrough and a connector adapted for being connected to a pressurized air supply. At least a top pontoon air valve is connected to the at least a top pontoon air conduit port of each top pontoon. The at least a top pontoon air valve enables controlling ambient air flow therethrough.

18 Claims, 14 Drawing Sheets

(51) Int. Cl.
| | |
|---|---|
| *B63B 35/44* | (2006.01) |
| *B63B 35/607* | (2006.01) |
| *B63B 35/613* | (2006.01) |
| *B63B 77/00* | (2020.01) |

(52) U.S. Cl.
CPC ............ *B63B 35/613* (2013.01); *B63B 77/00* (2020.01); *B63B 2207/02* (2013.01); *Y02A 40/81* (2018.01)

(58) Field of Classification Search
CPC . B63B 2207/02; B63B 2207/04; A01K 61/54; A01K 61/55; A01K 61/60; A01K 61/65; A01K 61/75; A01K 61/78; Y02A 40/81
See application file for complete search history.

(56) References Cited

U.S. PATENT DOCUMENTS

| | | | | |
|---|---|---|---|---|
| 10,051,844 | B2 * | 8/2018 | Newell .................. | A01G 31/02 |
| 10,945,417 | B2 * | 3/2021 | Odlin ................... | A01K 61/60 |
| 11,096,380 | B2 * | 8/2021 | Horzesky ............... | A01K 61/55 |
| 11,516,996 | B1 * | 12/2022 | DePaola ............... | A01K 61/60 |
| 12,329,136 | B1 * | 6/2025 | DePaola ............... | A01K 61/60 |
| 2020/0120905 | A1 * | 4/2020 | Menard ................... | B63B 43/06 |
| 2022/0000078 | A1 | 1/2022 | Odlin et al. | |
| 2022/0135187 | A1 * | 5/2022 | Nootz ................... | A01K 61/60 |
| | | | | 441/21 |
| 2022/0369605 | A1 * | 11/2022 | King ..................... | A01K 61/54 |

\* cited by examiner

101A

101B

101A

101B

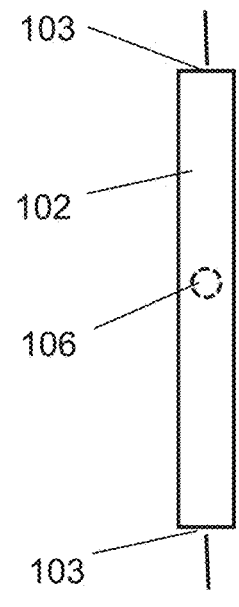
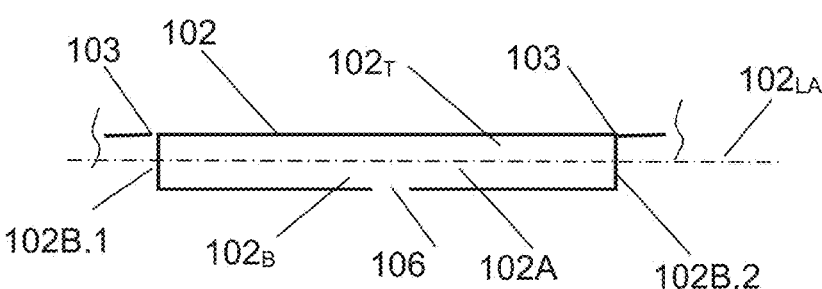
Figure 12
Figure 11
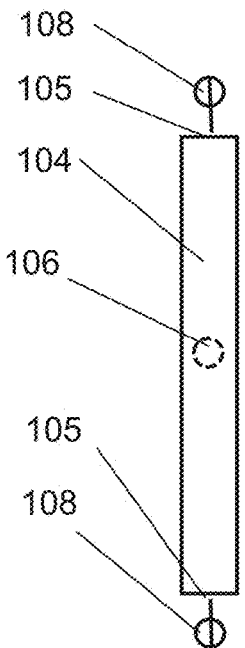
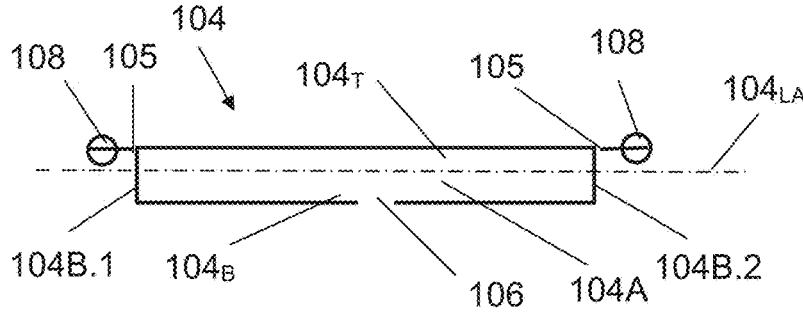
Figure 14
Figure 13

VARIABLE BUOYANCY PLATFORM FOR AQUACULTURE FARMING AND METHOD OF OPERATING THE SAME

This application is a continuation of U.S. application Ser. No. 19/083,928 filed on Mar. 19, 2025 and entitled Variable Buoyancy Platform For Aquaculture Farming And Method Of Operating The Same, which in turn claims priority to Canadian Patent Application No. 3,232,915 filed on Mar. 22, 2024 and entitled Variable Buoyancy Platform For Aquaculture Farming And Method Of Operating The Same. The entire contents of both of these applications are hereby incorporated by reference.

FIELD

The present disclosure relates to aquaculture farming equipment, and more particularly to a variable buoyancy platform and a method of operating the same for enabling simple adjustment of the level of the platform with respect to a surrounding water level.

BACKGROUND

In present-day oyster farming oysters are contained in bags placed in shallow waters on the seafloor in close proximity to the surface or in floating bags/cages. During the growing season between spring and autumn the bags/cages need to be flipped in the water several times to prevent or remove fouling. The bags/cages are flipped manually resulting in an extremely labor intensive and time-consuming task.

In colder climate zones the bags/cages need to be placed in deeper waters to a depth below the depth of the ice before the winter season and raised again in early spring. Typically, the bags/cages are manually lowered by divers, raised using mechanical equipment such as winches. As is evident, the lowering/rising of the bags/cages is also extremely labor intensive and time consuming.

The location of the bags/cages in shallow coastal waters exposes the same to the full forces of storms potentially resulting in substantial damage to or even complete loss of the bags and their contents, since the process of moving the same out of harms way is too time consuming.

It may be desirable to provide a variable buoyancy platform capable of adjusting the level of the platform with respect to a surrounding water level that enables substantially safe and reliable lifting and lowering.

It also may be desirable to provide a variable buoyancy platform capable of adjusting the level of the platform with respect to a surrounding water level that is simple and cost effective to manufacture.

It also may be desirable to provide a variable buoyancy platform capable of adjusting the level of the platform with respect to a surrounding water level that is easy to operate.

It also may be desirable to provide a variable buoyancy platform capable of adjusting the level of the platform with respect to a surrounding water level that enables easy adjustment of the level of the platform between a raised position and a growing position.

SUMMARY

Accordingly, one advantage is to provide a variable buoyancy platform capable of adjusting the level of the platform with respect to a surrounding water level that enables substantially safe and reliable lifting and lowering.

Another advantage is to provide a variable buoyancy platform capable of adjusting the level of the platform with respect to a surrounding water level that is simple and cost effective to manufacture.

Another advantage is to provide a variable buoyancy platform capable of adjusting the level of the platform with respect to a surrounding water level that is easy to operate.

Another advantage is to provide a variable buoyancy platform capable of adjusting the level of the platform with respect to a surrounding water level that enables easy adjustment of the level of the platform between a raised position and a growing position.

According to one aspect, there is provided a variable buoyancy platform. The variable buoyancy platform comprises a support frame having a plurality of bottom pontoons fixedly mounted to a bottom side thereof. Each bottom pontoon comprises at least an opening disposed in a bottom portion thereof and at least a bottom pontoon air conduit port disposed in a top portion thereof. A plurality of top pontoons are fixedly mounted to a top side of the support frame. Each top pontoon comprises at least an opening disposed in a bottom portion thereof and at least a top pontoon air conduit port disposed in a top portion thereof. A bottom air supply conduit system is connected to the at least a bottom pontoon air conduit port of each bottom pontoon. The bottom air supply conduit system comprises at least an air supply valve for controlling air flow therethrough and a connector adapted for being connected to a pressurized air supply. At least a top pontoon air valve is connected to the at least a top pontoon air conduit port of each top pontoon. The at least a top pontoon air valve enables controlling ambient air flow therethrough.

According to an aspect of the present disclosure, there is provided a variable buoyancy platform. The variable buoyancy platform comprises a support frame having a plurality of bottom pontoons fixedly mounted to a bottom side thereof. Each bottom pontoon comprises at least an opening disposed in a bottom portion thereof and at least a bottom pontoon air conduit port disposed in a top portion thereof. A plurality of top pontoons are fixedly mounted to a top side of the support frame. Each top pontoon comprises at least an opening disposed in a bottom portion thereof and at least a top pontoon air conduit port disposed in a top portion thereof. A bottom air supply conduit system is connected to the at least a bottom pontoon air conduit port of each bottom pontoon. The bottom air supply conduit system comprises at least an air supply valve for controlling air flow therethrough and a connector adapted for being connected to a pressurized air supply. At least a top pontoon air valve is connected to the at least a top pontoon air conduit port of each top pontoon. The at least a top pontoon air valve enables controlling ambient air flow therethrough. Each bottom pontoon and each top pontoon comprises an elongated body having two end walls at a first end and a second end thereof. Each bottom pontoon has at least an opening disposed in a bottom portion of the elongated body in proximity to a center location between the first end and the second end thereof and each bottom pontoon comprises a first bottom pontoon air conduit port disposed in proximity to the first end and a second bottom pontoon air conduit port disposed in proximity to the second end. The bottom air supply conduit system comprises a first air supply conduit connected to the first bottom pontoon air conduit ports and a second air supply conduit connected to the second bottom pontoon air conduit ports. A combining element is connected to the first air supply conduit and the second air supply conduit for combining the same. The at least an air supply valve is interposed between the combining element and the connector for controlling pressurized air flow therethrough.

According to an aspect of the present disclosure, there is provided a variable buoyancy platform. The variable buoyancy platform comprises a support frame having a plurality of bottom pontoons fixedly mounted to a bottom side thereof. Each bottom pontoon comprises at least an opening disposed in a bottom portion thereof and at least a bottom pontoon air conduit port disposed in a top portion thereof. A plurality of top pontoons are fixedly mounted to a top side of the support frame. Each top pontoon comprises at least an opening disposed in a bottom portion thereof and at least a top pontoon air conduit port disposed in a top portion thereof. A bottom air supply conduit system is connected to the at least a bottom pontoon air conduit port of each bottom pontoon. The bottom air supply conduit system comprises at least an air supply valve for controlling air flow therethrough and a connector adapted for being connected to a pressurized air supply. At least a top pontoon air valve is connected to the at least a top pontoon air conduit port of each top pontoon. The at least a top pontoon air valve enables controlling ambient air flow therethrough. Each bottom pontoon and each top pontoon comprises an elongated body having two end walls at a first end and a second end thereof. Each bottom pontoon has at least an opening disposed in a bottom portion of the elongated body in proximity to a center location between the first end and the second end thereof and each bottom pontoon comprises a first bottom pontoon air conduit port disposed in proximity to the first end and a second bottom pontoon air conduit port disposed in proximity to the second end. The bottom air supply conduit system comprises a first air supply conduit connected to the first bottom pontoon air conduit ports and a second air supply conduit connected to the second bottom pontoon air conduit ports. A combining element is connected to the first air supply conduit and the second air supply conduit for combining the same. The at least an air supply valve comprises a first air supply valve interposed between the first bottom pontoon air conduit ports and the combining element for controlling air flow therethrough and a second air supply valve interposed between the second bottom pontoon air conduit ports and the combining element for controlling air flow therethrough.

According to one aspect of the present disclosure, there is provided a variable buoyancy platform. The variable buoyancy platform comprises a support frame having a plurality of bottom pontoons fixedly mounted to a bottom side thereof. Each bottom pontoon comprises at least an opening disposed in a bottom portion thereof and at least a bottom pontoon air conduit port disposed in a top portion thereof. A plurality of top pontoons are fixedly mounted to a top side of the support frame. Each top pontoon comprises at least an opening disposed in a bottom portion thereof and at least a top pontoon air conduit port disposed in a top portion thereof. A bottom air supply conduit system is connected to the at least a bottom pontoon air conduit port of each bottom pontoon. The bottom air supply conduit system comprises at least an air supply valve for controlling air flow therethrough and a connector adapted for being connected to a pressurized air supply. At least a top pontoon air valve is connected to the at least a top pontoon air conduit port of each top pontoon. The at least a top pontoon air valve enables controlling ambient air flow therethrough. The bottom air conduit system comprises at least a bottom pontoon air valve for controlling air flow therethrough.

According to another aspect of the present disclosure, there is provided a method of operating a variable buoyancy platform. The variable buoyancy platform comprises a support frame having a plurality of bottom pontoons fixedly mounted to a bottom side thereof. Each bottom pontoon comprises at least an opening disposed in a bottom portion thereof and at least a bottom pontoon air conduit port disposed in a top portion thereof. A plurality of top pontoons are fixedly mounted to a top side of the support frame. Each top pontoon comprises at least an opening disposed in a bottom portion thereof and at least a top pontoon air conduit port disposed in a top portion thereof. A bottom air supply conduit system is connected to the at least a bottom pontoon air conduit port of each bottom pontoon. The bottom air supply conduit system comprises at least an air supply valve for controlling pressurized air flow therethrough and a connector adapted for being connected to a pressurized air supply. At least a top pontoon air valve is connected to the at least a top pontoon air conduit port of each top pontoon. The at least a top pontoon air valve enables controlling of ambient air flow therethrough. When the platform is in a sunken position, the connector is connected to a pressurized air supply and pressurized air is provided to the bottom pontoons causing water to be displaced in the bottom pontoons until the platform is in a raised position with a top of the support frame being above a water level surrounding the platform. The at least an air supply valve is then closed and the connector is disconnected. Water is released from the top pontoons with the at least a top pontoon air valve being open for enabling ingress of ambient air into the top pontoons.

According to another aspect of the present disclosure, there is provided a method of operating a variable buoyancy platform. The variable buoyancy platform comprises a support frame having a plurality of bottom pontoons fixedly mounted to a bottom side thereof. Each bottom pontoon comprises at least an opening disposed in a bottom portion thereof and at least a bottom pontoon air conduit port disposed in a top portion thereof. A plurality of top pontoons are fixedly mounted to a top side of the support frame. Each top pontoon comprises at least an opening disposed in a bottom portion thereof and at least a top pontoon air conduit port disposed in a top portion thereof. A bottom air connector conduit system is connected to the at least a bottom pontoon air conduit port of each bottom pontoon. The bottom air connector conduit system comprises at least an air supply valve for controlling air flow therethrough and a connector adapted for being connected to a pressurized air supply. At least a top pontoon air valve is connected to the at least a top pontoon air conduit port of each top pontoon. The at least a top pontoon air valve enables controlling of ambient air flow therethrough. When the platform is in a sunken position, the connector is connected to a pressurized air supply and pressurized air is provided to the bottom pontoons causing water to be displaced in the bottom pontoons until the platform is in a raised position with a top of the support frame being above a water level surrounding the platform. The at least an air supply valve is then closed and the connector is disconnected. Water is released from the top pontoons with the at least a top pontoon air valve being open for enabling ingress of ambient air into the top pontoons. The at least a top pontoon air valve is closed. Water is enabled to flow into the bottom pontoons until the platform is lowered to a growing position with the top pontoons being partially submerged.

According to another aspect of the present disclosure, there is provided a method of operating a variable buoyancy platform. The variable buoyancy platform comprises a support frame having a plurality of bottom pontoons fixedly mounted to a bottom side thereof. Each bottom pontoon comprises at least an opening disposed in a bottom portion thereof and at least a bottom pontoon air conduit port disposed in a top portion thereof. A plurality of top pontoons are fixedly mounted to a top side of the support frame. Each top pontoon comprises at least an opening disposed in a bottom portion thereof and at least a top pontoon air conduit port disposed in a top portion thereof. A bottom air supply conduit system is connected to the at least a bottom pontoon air conduit port of each bottom pontoon. The bottom air supply conduit system comprises at least an air supply valve for controlling air flow therethrough and a connector adapted for being connected to a pressurized air supply. At least a top pontoon air valve is connected to the at least a top pontoon air conduit port of each top pontoon. The at least a top pontoon air valve enables controlling ambient air flow therethrough. When the platform is in a sunken position, the connector is connected to a pressurized air supply and pressurized air is provided to the bottom pontoons causing water to be displaced in the bottom pontoons until the platform is in a raised position with a top of the support frame being above a water level surrounding the platform. The at least an air supply valve is then closed and the connector is disconnected. Water is released from the top pontoons with the at least a top pontoon air valve being open for enabling ingress of ambient air into the top pontoons. Pressurized air flow is provided through a first air supply conduit of the bottom air supply conduit system connected to first bottom pontoon air conduit ports disposed in proximity to a first end of the bottom pontoons and through a second air supply conduit of the bottom air supply conduit system connected to second bottom pontoon air conduit ports disposed in proximity to a second end of the bottom pontoons. Provision of the pressurized air flow through the first air conduit and the second air conduit is controlled such that the platform is substantially balanced when lifted from the sunken position to the raised position.

An advantage of the present disclosure is that it provides a variable buoyancy platform capable of adjusting the level of the platform with respect to a surrounding water level that enables substantially safe and reliable lifting and lowering.

A further advantage is that it provides a variable buoyancy platform capable of adjusting the level of the platform with respect to a surrounding water level that is simple and cost effective to manufacture.

A further advantage is that it provides a variable buoyancy platform capable of adjusting the level of the platform with respect to a surrounding water level that is easy to operate.

A further advantage is that it provides a variable buoyancy platform capable of adjusting the level of the platform with respect to a surrounding water level that enables easy adjustment of the level of the platform between a raised position and a growing position.

BRIEF DESCRIPTION OF THE DRAWINGS

An embodiment is described below with reference to the accompanying drawings, in which:

FIG. 11 is a simplified block diagram illustrating in a top view a bottom pontoon of the variable buoyancy platform according to an embodiment;

FIG. 12 is a simplified block diagram illustrating in a side view a bottom pontoon of the variable buoyancy platform according to an embodiment;

FIG. 13 is a simplified block diagram illustrating in a top view a top pontoon of the variable buoyancy platform according to an embodiment;

FIG. 14 is a simplified block diagram illustrating in a side view a top pontoon of the variable buoyancy platform according to an embodiment;

DETAILED DESCRIPTION

Figure 1:
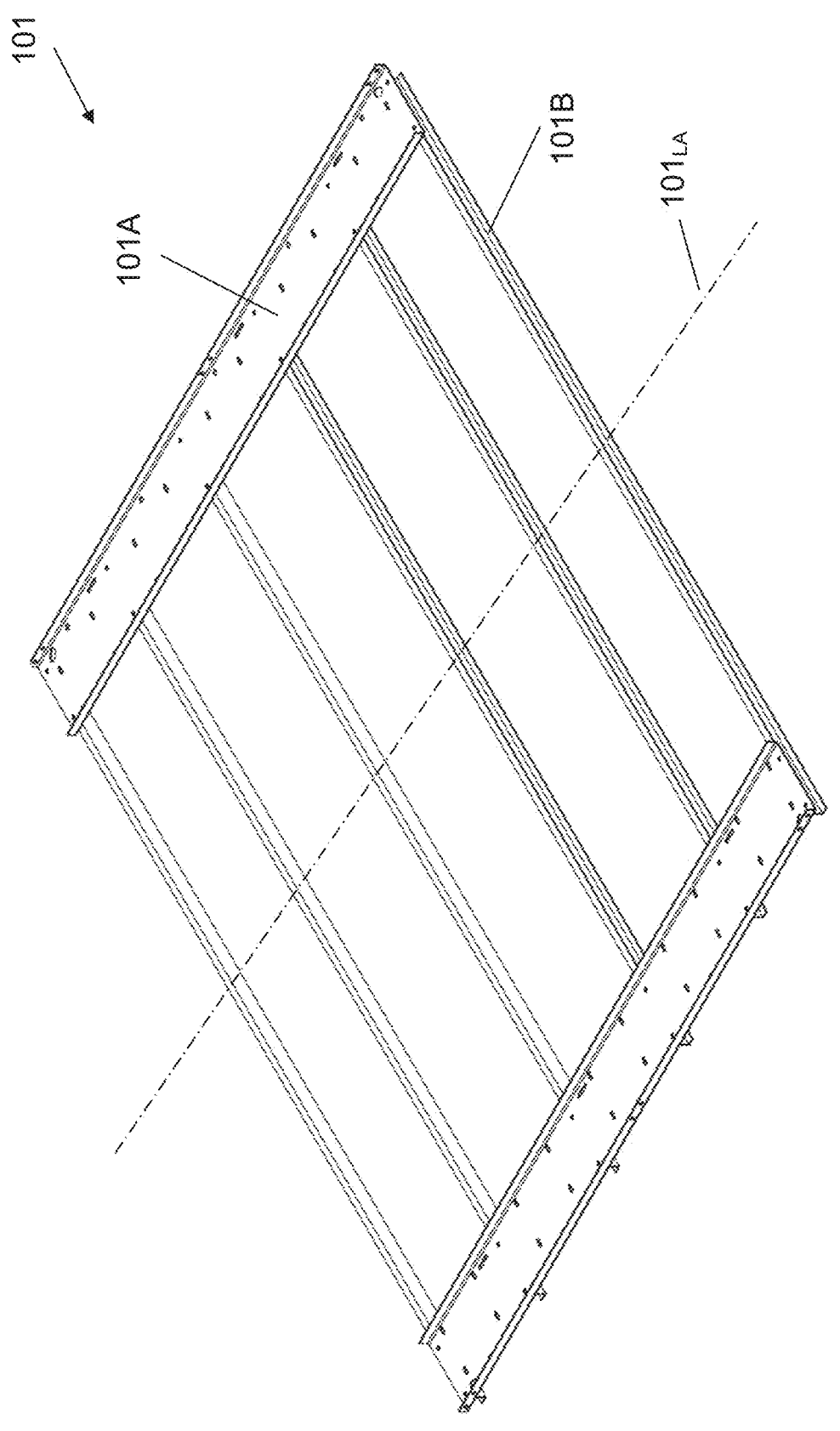
FIG. 1 is a simplified block diagram illustrating in a top perspective view a support frame of a variable buoyancy platform according to an embodiment.
Figure 2:
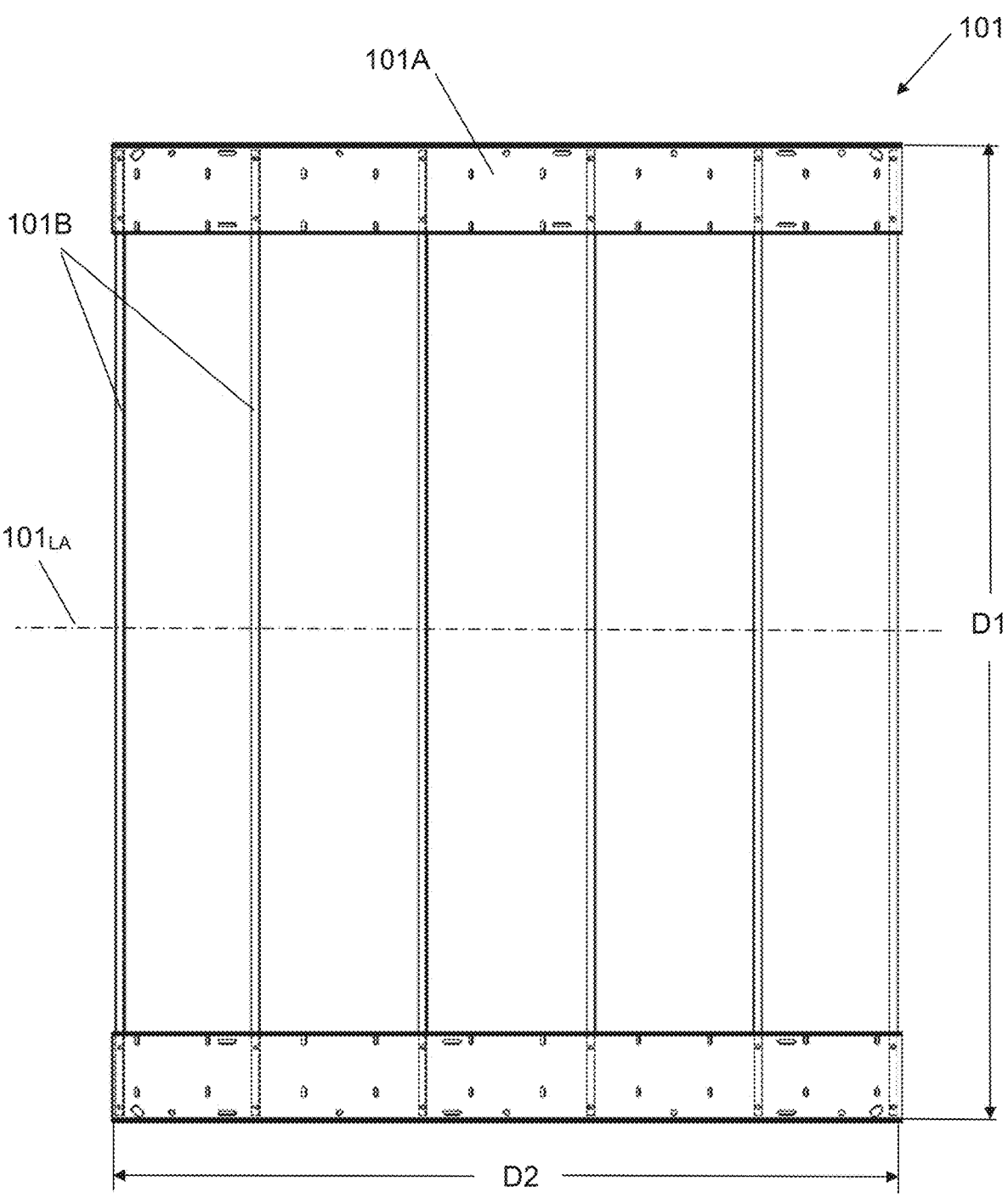
FIG. 2 is a simplified block diagram illustrating in a top view a support frame of a variable buoyancy platform according to an embodiment.
Figure 3:
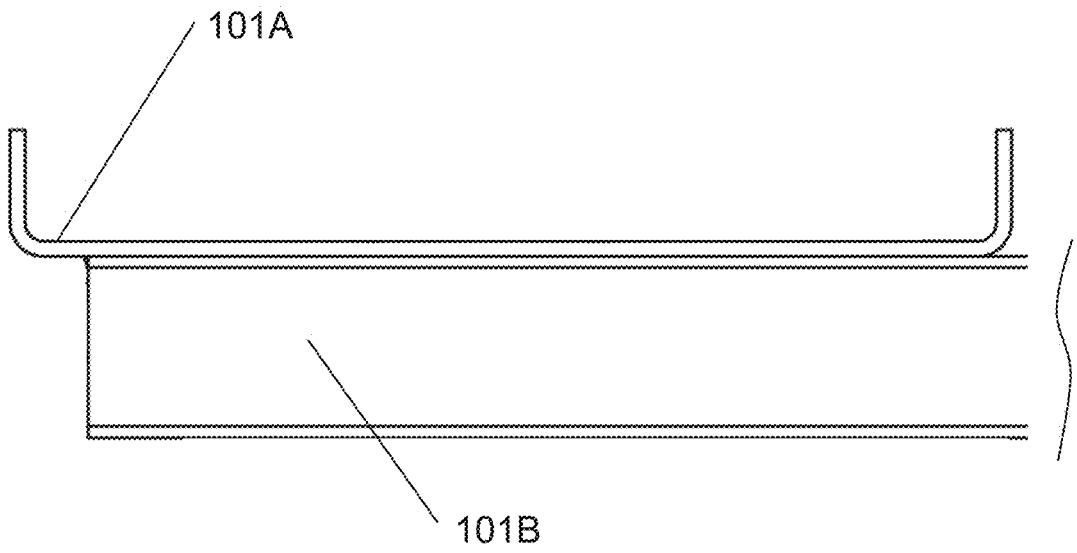
FIG. 3 is a simplified block diagram illustrating in end view a support frame of a variable buoyancy platform according to an embodiment.
Figure 4:
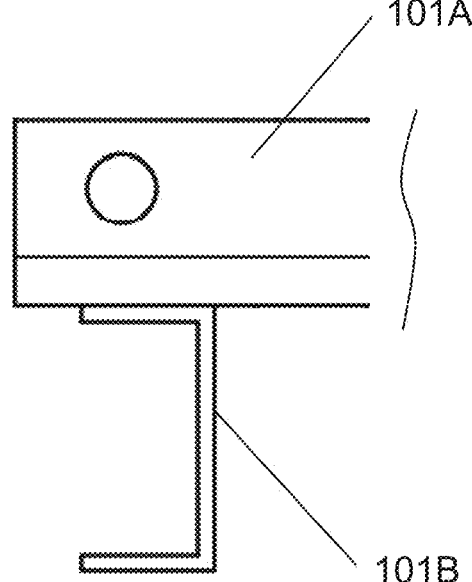
FIG. 4 is a simplified block diagram illustrating in end view a support frame of a variable buoyancy platform according to an embodiment.
Figure 5:
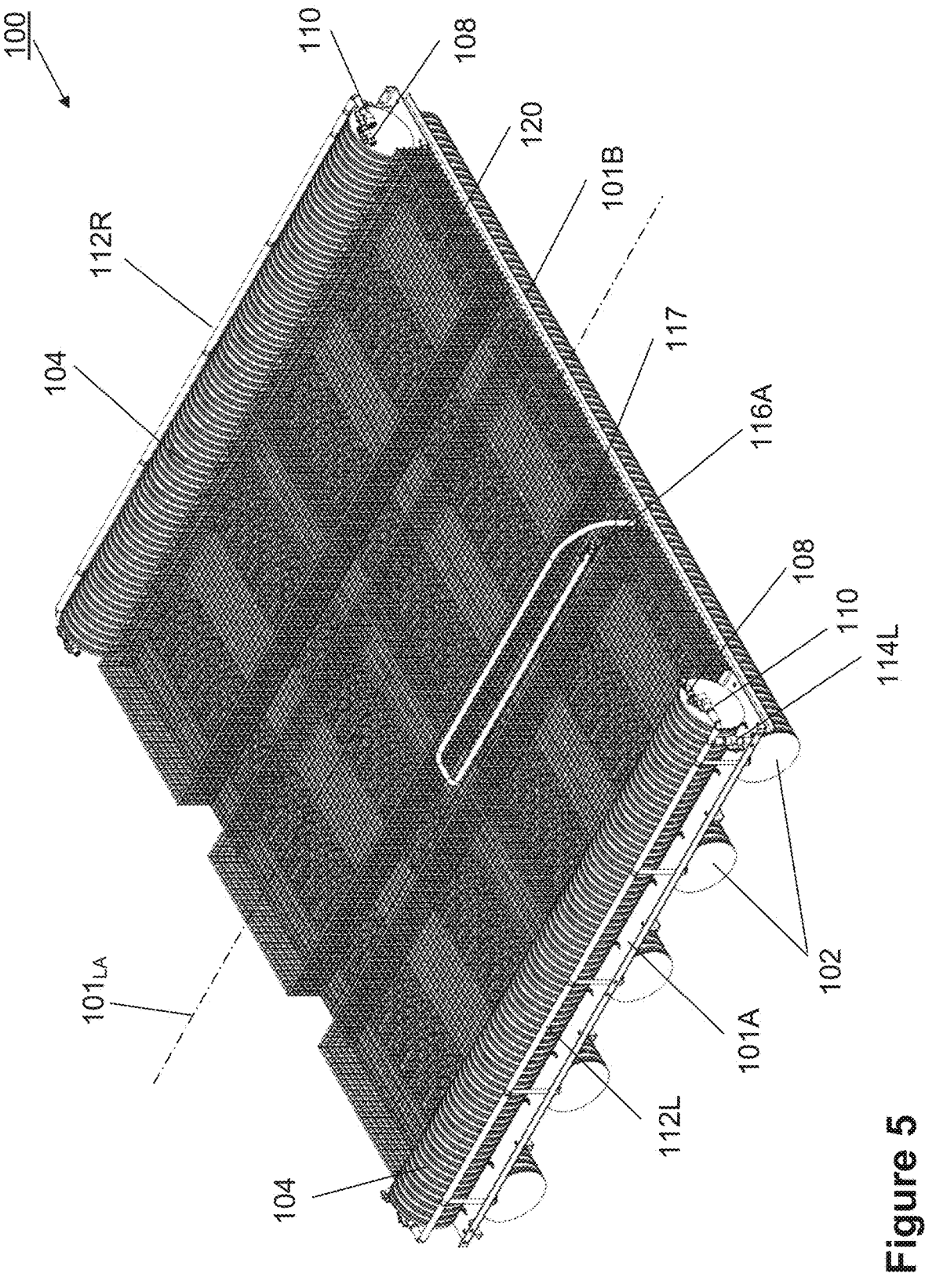
FIG. 5 is a simplified block diagram illustrating in a top perspective view the variable buoyancy platform according to an embodiment.
Figure 6:
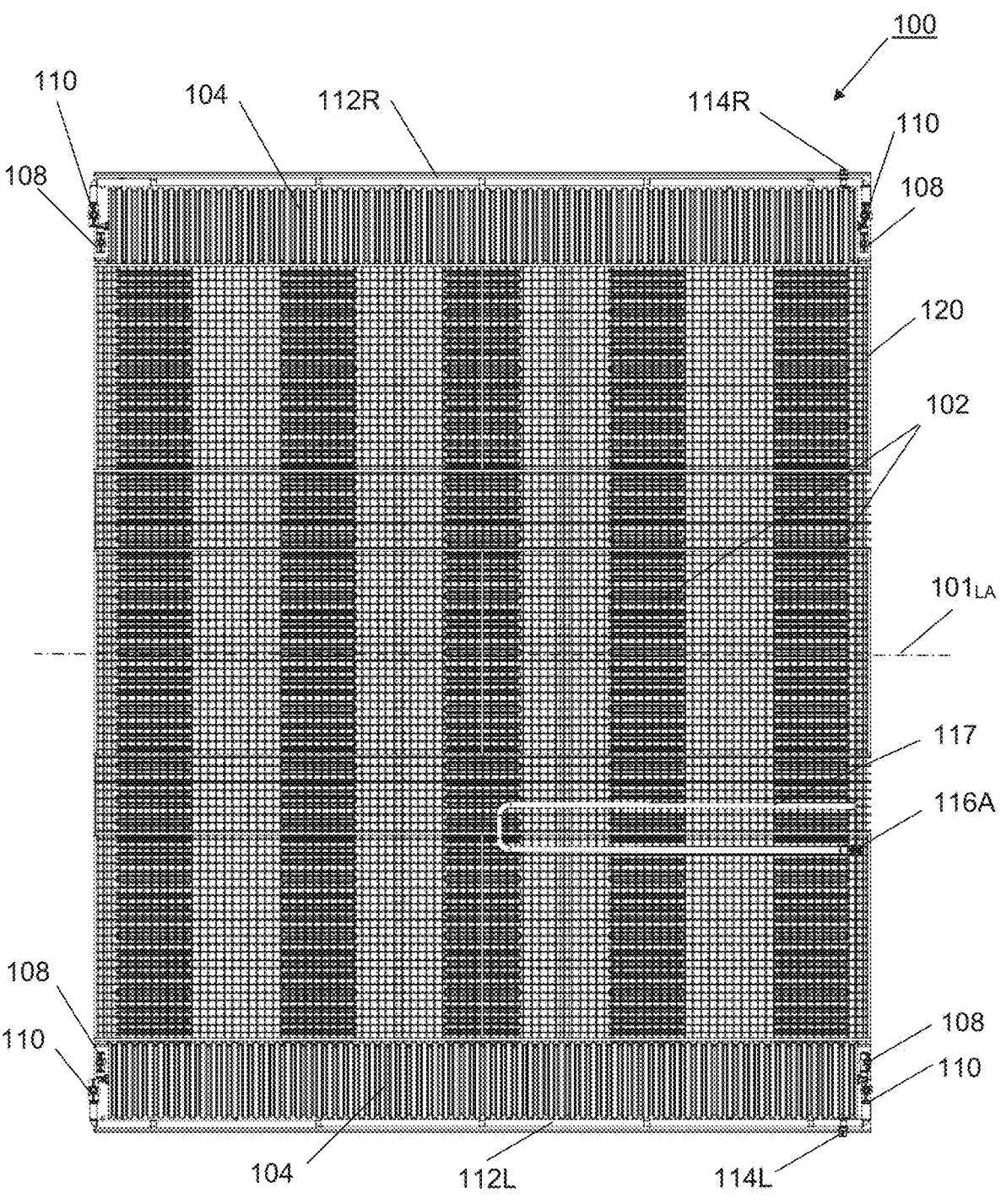
FIG. 6 is a simplified block diagram illustrating in a top view the variable buoyancy platform according to an embodiment.
Figure 7:
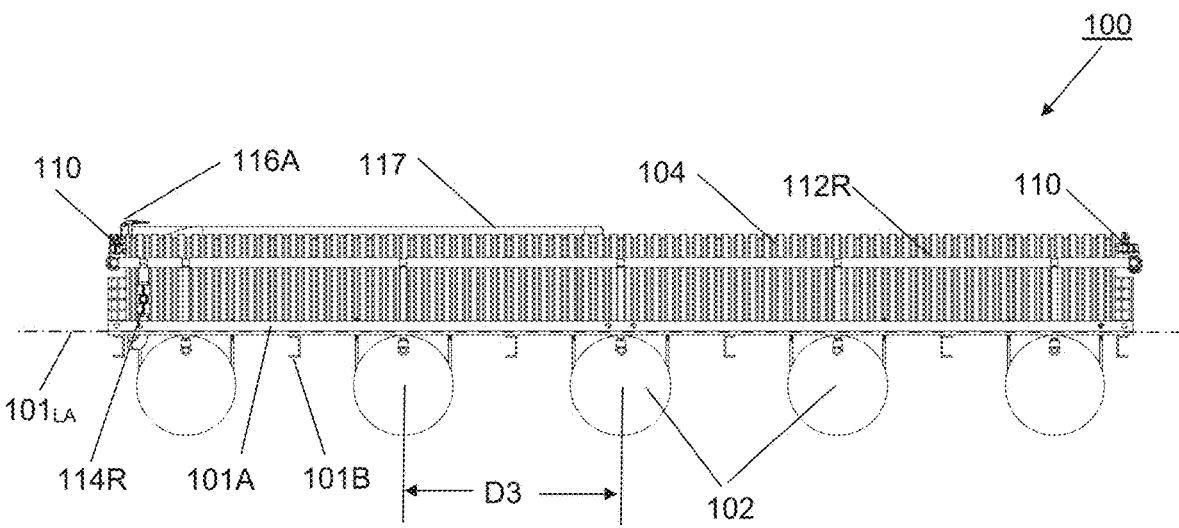
FIG. 7 is a simplified block diagram illustrating in a side view the variable buoyancy platform according to an embodiment.
Figure 8:
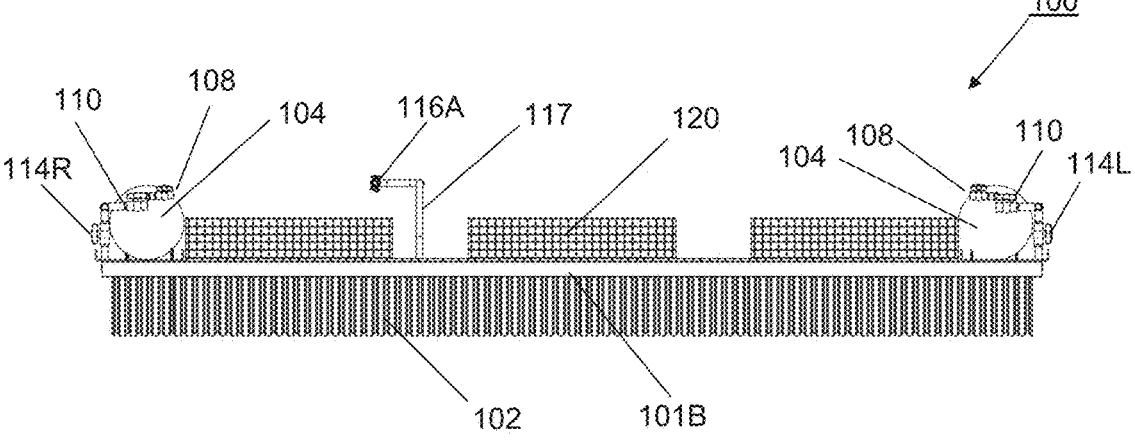
FIG. 8 is a simplified block diagram illustrating in a rear view the variable buoyancy platform according to an embodiment.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While the description of the embodiments hereinbelow is with reference to a variable buoyancy platform for oyster farming, it will become evident to those skilled in the art that the embodiments of the invention are not limited thereto, but are also adaptable for use with aquaculture farming of, for example, other types of shellfish such as mussels.

Referring to FIGS. 1 to 21 a variable buoyancy platform 100 according to an embodiment provided. The variable buoyancy platform 100 comprises a substantially rigid support frame 101 having, for example, a substantially flat rectangular shape with two longitudinal beams 101A oriented substantially parallel to a longitudinal axis 101$_{LA}$ of the support frame 101 which are connected together via transverse beams 101B oriented substantially perpendicular thereto, as illustrated in FIGS. 1 to 4. The support frame 101 is made of, for example, commercially available U-shaped aluminum profiles and assembled in a conventional manner using, for example, screw fastening and/or welding. The employment of the U-shaped profiles with the transverse beams 101B mounted to a bottom side of the longitudinal beams 101A has been chosen to provide a substantially rigid structure that is simple and cost effective to manufacture, but is not limited thereto. As is evident to a person skilled in the art, different shapes of the support frame, different arrangements of the profiles, differently shaped profiles such as, for example, T-shaped profiles, I-shaped profiles, or combinations thereof, as well as other materials such as, for example, galvanized steel or stainless steel, may be employed depending on design preferences.

A plurality of compartments 120 can be mounted to a top side of the support frame 101 for accommodating the oyster bags therein. The compartmentalization of the top side of the support frame 101 facilitates even placement of the oyster bags, as well as prevents the same from shifting, for example, during lowering or lifting of the platform 100. The bottom and the sides of the compartments 120 are provided, for example, as commercially available lattice structures made of, for example, a plastic material such as PolyVinyl-Chloride (PVC). The compartments 120 are mounted to the support frame 101 in a conventional manner using, for example, screw fastening. A floor can be disposed between the compartments 120 to facilitate an operator's access to the oyster bags disposed in the compartments, as well as to access different locations of the platform 100 for operating the same. The floor is provided, for example, as a commercially available lattice structure made of, for example, a plastic material such as Poly VinylChloride (PVC), mounted to the support frame 101 in a conventional manner using, for example, screw fastening. Alternatively, other, in one case light weight, materials may be employed for providing the compartments and floor such as, for example, fiber glass material. Further alternatively, the floor is provided covering the top surface of the support frame 101 with the compartments 120 disposed thereon.

A plurality of bottom pontoons 102 are fixedly mounted to a bottom side of the support frame 101 and a plurality of top pontoons 104 are fixedly mounted to a top side of the support frame 101. The bottom pontoons 102 and the top pontoons 104 can be mounted to the support frame 101 such that a longitudinal axis 102$_{LA}$, 104$_{LA}$ of each of the bottom pontoons 102 and the top pontoons 104 is oriented substantially parallel to the support frame 101 and such that, in one case, the longitudinal axis 102$_{LA}$ of each of the bottom pontoons 102 is oriented substantially perpendicular to the longitudinal axis 101$_{LA}$ of the support frame 101 and the longitudinal axis 104$_{LA}$ of each of the top pontoons 104 is oriented substantially parallel to the longitudinal axis 101$_{LA}$ of the support frame 101, as illustrated in FIGS. 5 to 10.

Each of the bottom pontoons 102 can comprise an elongated body such as, for example, a cylindrical wall 102A with two end walls 102B.1, 102B.2 mounted in a sealed fashion to the cylindrical wall 102A at a first end and a second end thereof, respectively, as illustrated in FIGS. 11 and 12. In a similar manner each of the top pontoons 104 comprises an elongated body such as, for example, a cylindrical wall 104A with two end walls 104B.1, 104B.2 mounted in a sealed fashion to the cylindrical wall 104A at a first end and a second end thereof, respectively, as illustrated in FIGS. 13 and 14.

The cylindrical walls 102A, 104A can be corrugated to increase the strength of the same. The pontoons 102, 104 are manufactured using, for example, commercially available plastic tubing made of Poly Vinyl Chloride (PVC) or High-Density PolyEthylene (HDPE) and PVC or HDPE sheet material, and are assembled using conventional fastening such as an adhesive. Provision of the pontoons 102, 104 with a corrugated wall 102A, 104A substantially facilitates mounting of the same to the support frame 101 using, for example, U-bolts disposed in valleys between two adjacent ridges with the U-bolt being mounted to the support frame 101 using, for example, screw fastening, thus enabling simple removal/reinstallment of the pontoons 102, 104 for repair or replacement in case of damage. Alternatively, the pontoons 102, 104 maybe provided having different shapes such as, for example, having a rectangular or oval cross-section, and walls, such as, for example, smooth walls, and are made of different materials such as, for example, fiber-glass. Further alternatively, the pontoons 102, 104 may be arranged differently such as, for example, using two smaller pontoons instead of one larger pontoon, and/or placing some of the bottom pontoons 102 having a different orientation, and/or placing some of the top pontoons 104 having a different orientation.

Each bottom pontoon 102 comprises at least an opening 106 disposed in a bottom portion 102$_B$ thereof and at least a bottom pontoon air conduit port 103 disposed in a top portion 102$_T$ thereof. Each bottom pontoon 102 can comprise an opening 106 having, for example, a circular cross-section with a 2 inch diameter, placed in the bottom portion of the elongated body 102A in proximity to a center location between the first end and the second end thereof and a first bottom pontoon air conduit port 103 disposed in proximity to the first end, for example, in the top portion of the first end wall 102B.1, and a second bottom pontoon air conduit port 103 disposed in proximity to the second end, for example, in the top portion of the second end wall 102B.2, as illustrated in FIGS. 11 and 12.

Similarly, each top pontoon 104 comprises at least an opening 106 disposed in a bottom portion 104$_B$ thereof and at least a top pontoon air conduit port 105 disposed in a top portion 104$_T$ thereof. Each top pontoon 104 can comprise an opening 106 having, for example, a circular cross-section with a 2 inch diameter, placed in the bottom portion of the elongated body 104A in proximity to a center location between the first end and the second end thereof and a first top pontoon air conduit port 105 disposed in proximity to the first end, for example, in the top portion of the first end wall 104B.1, and a second top pontoon air conduit port 105 disposed in proximity to the second end, for example, in the top portion of the second end wall 104B.2, as illustrated in FIGS. 13 and 14. Further, each of the first and second top pontoon air conduit ports 105 can be connected to respective first and second top pontoon air valves 108 for selectively blocking or enabling ingress of ambient air into the top pontoon 104 or egress of air from the top pontoon 104 to the outside, as illustrated in FIGS. 13 and 14. Alternatively only one top pontoon air conduit port 105 connected to a top pontoon air valve 108 is employed, for example, placed in proximity to the center location in combination with two openings 106 which are placed in proximity to the first and the second end of the top pontoon 104.

Alternatively, a plurality of openings 106 placed adjacent to each other and/or openings 106 having a different cross-section such as, for example, oval or slit-type may be employed depending on design preferences.

Figure 9:
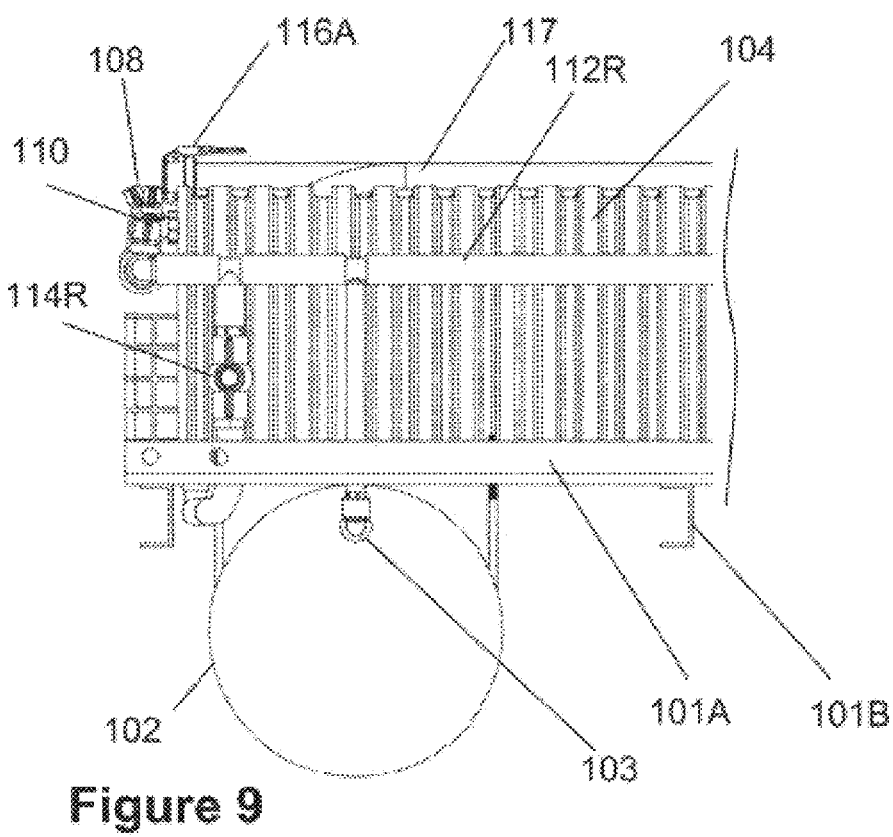
FIG. 9 is a simplified block diagram illustrating in a detail view the variable buoyancy platform according to an embodiment.
Figure 10:
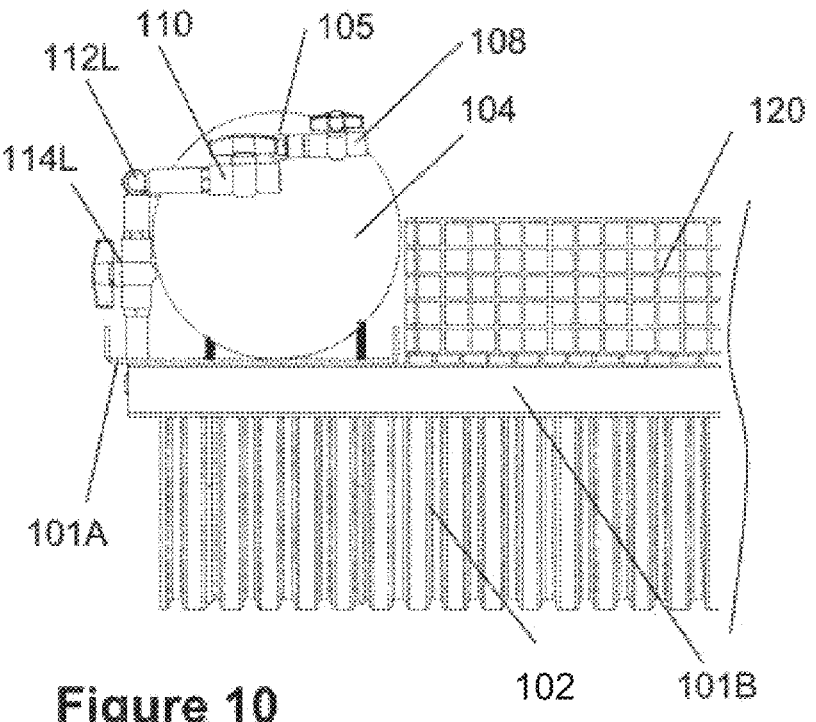
FIG. 10 is a simplified block diagram illustrating in a detail view the variable buoyancy platform according to an embodiment.
Figure 15:
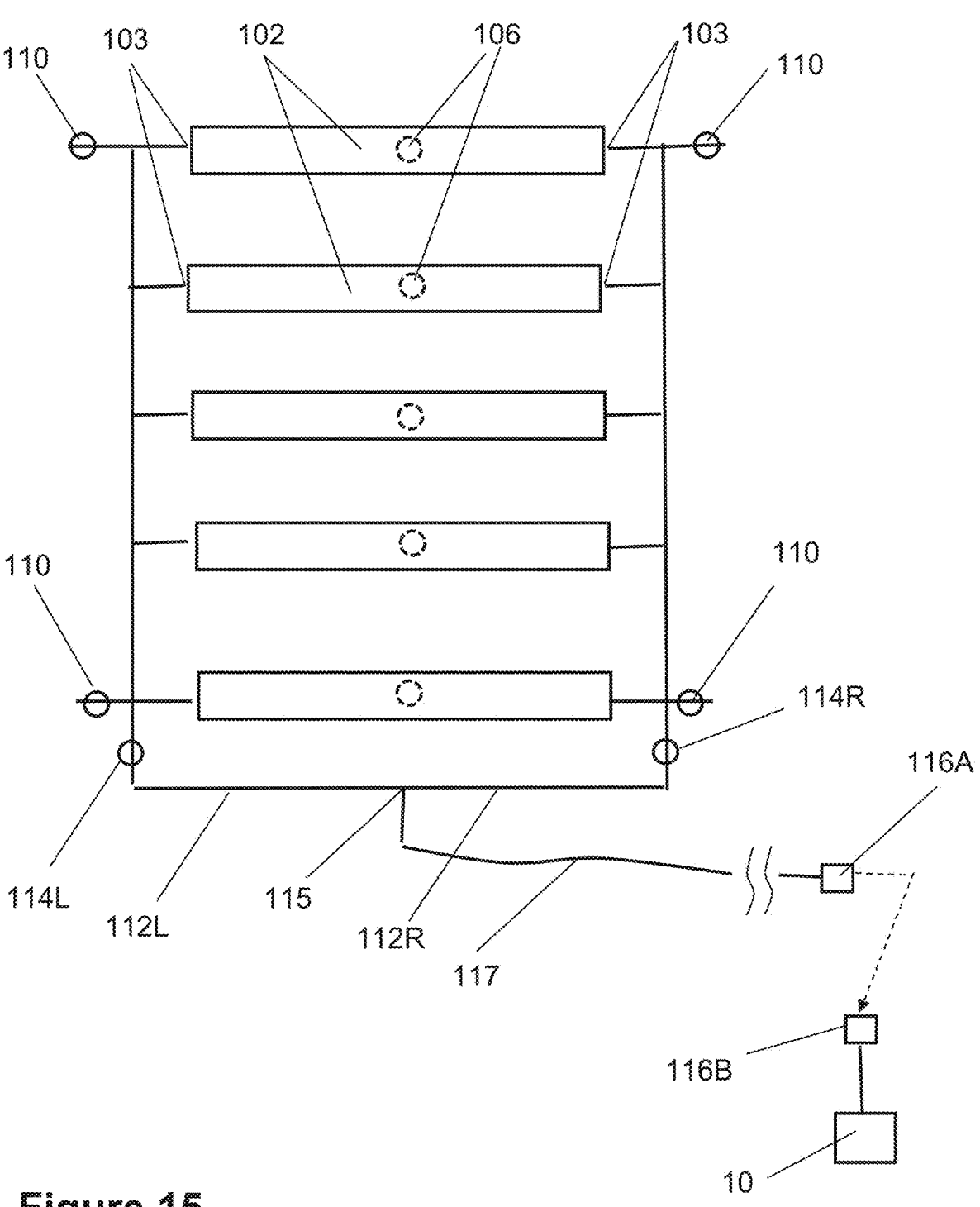
FIG. 15 is a simplified block diagram illustrating in a top view a bottom air conduit system of the variable buoyancy platform according to an embodiment.

Referring to FIG. 15, a bottom air supply conduit system of the variable buoyancy platform 100 according to an embodiment is provided. A left hand side air supply conduit 112L can be connected to respective left hand side bottom pontoon air conduit ports 103 of the bottom pontoons 102. Similarly, a right hand side air supply conduit 112R is connected to respective right hand side bottom pontoon air conduit ports 103 of the bottom pontoons 102, as illustrated in FIG. 9.

Figure 19:
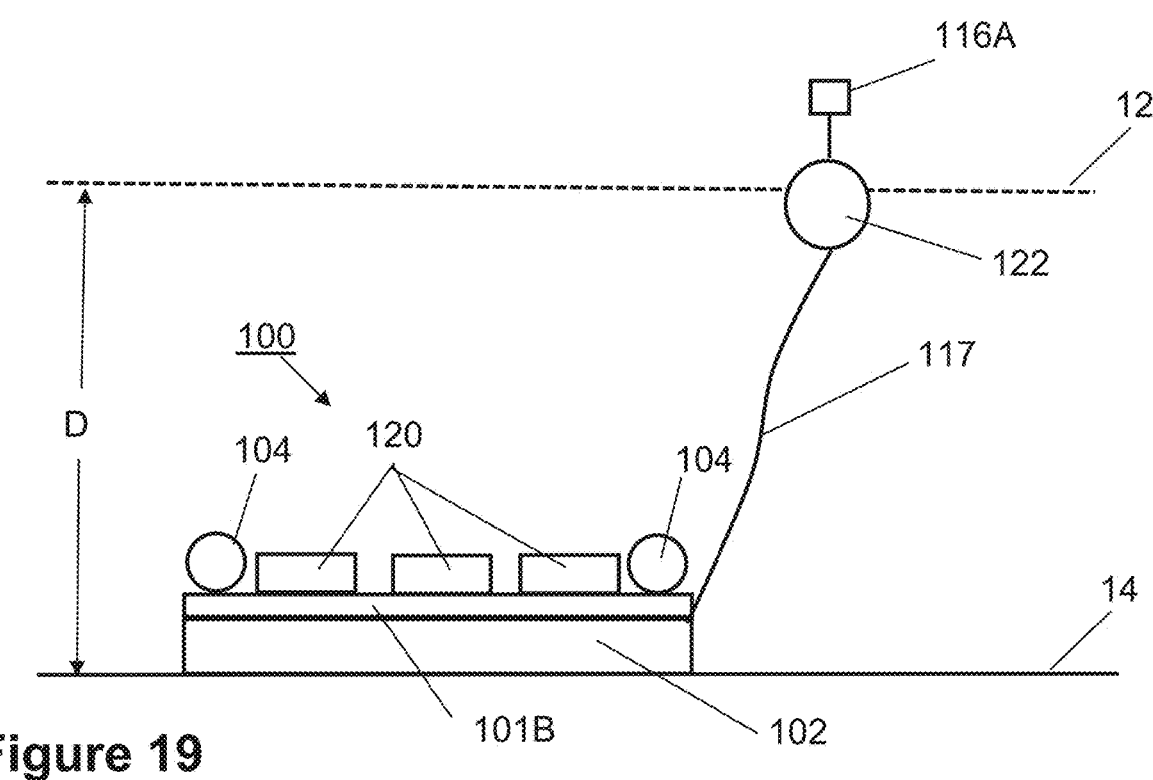
FIG. 19 is a simplified block diagram illustrating in front view the variable buoyancy platform according to an embodiment in a sunken mode of operation.

The left hand side air supply conduit 112L and the right hand side air supply conduit 112R are combined via combining element 115, for example, a T-element or Y-element, connected thereto and to air supply connecting element 116A via air supply line 117. The air supply connecting element 116A is adapted for being mated with a respective air supply connecting element 116B connected to a pressurized air supply 10 such as, for example, a commercially available high pressure blower capable of providing a pressurized air flow at a pressure of 3-4 PSI. The air supply connecting elements 116A, 116B are, for example, commercially available quick connect couplers. The left hand side air supply conduit 112L and the right hand side air supply conduit 112R can each comprise an air supply valve 114L and 114R, respectively, for controlling air flow to/from the bottom pontoons 102. Further, the air supply line 117 can be provided as a flexible hose such as, for example, a commercially available rubber or plastic hose, having sufficient length to reach from the platform 100 when placed on the seafloor 14, typically at a depth between 6 and 15 feet, to the water surface 12, as illustrated in FIG. 19. The end portion of the air supply line 117 and the air supply connecting element 116A are mounted to a floating device such as, for example, buoy 122, to enable rising of the platform 100 from the seafloor 14, as illustrated in FIG. 19, by simply mating the air supply connecting elements 116A and 116B and providing the pressurized air flow, as will be described hereinbelow.

The bottom air supply conduit system can comprise at least a bottom pontoon air valve 110 for controlling air flow therethrough and, in particular, for selectively blocking or enabling egress of pressurized air from the bottom pontoons 102 to the outside as will be described hereinbelow. For example, each of the air supply conduits 112L and 112R comprises a bottom pontoon air valve 110 at each of a first and a second end thereof for enabling balanced release of air from the bottom pontoons 102, as illustrated in FIG. 15. As is evident to a person of skill in the art, different numbers of bottom pontoon air valves 110 may be employed and/or the bottom pontoon air valves 110 may be placed at different locations of the bottom air supply conduit system depending on design preferences. Alternatively, the bottom pontoon air valves 110 may be omitted and air is released from the bottom pontoons 102 via the air supply valves 114L and 114R.

Figure 16:
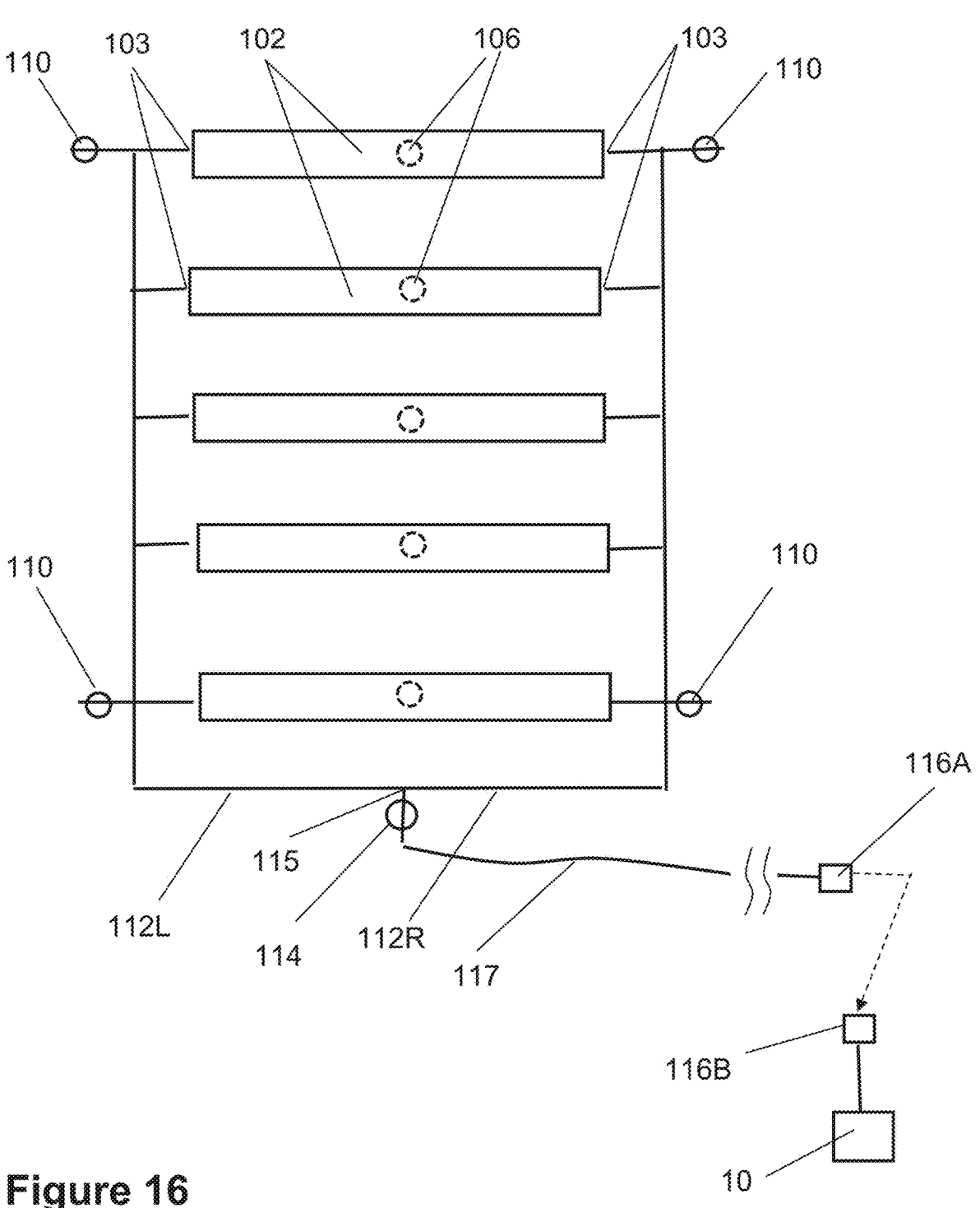
FIG. 16 is a simplified block diagram illustrating in a top view a modification of the bottom air conduit system of the variable buoyancy platform according to an embodiment.

Alternatively, only one air supply valve 114 interposed between the combining element 115 and the pressurized air connecting element 116A may be employed, as illustrated in FIG. 16.

Figure 17:
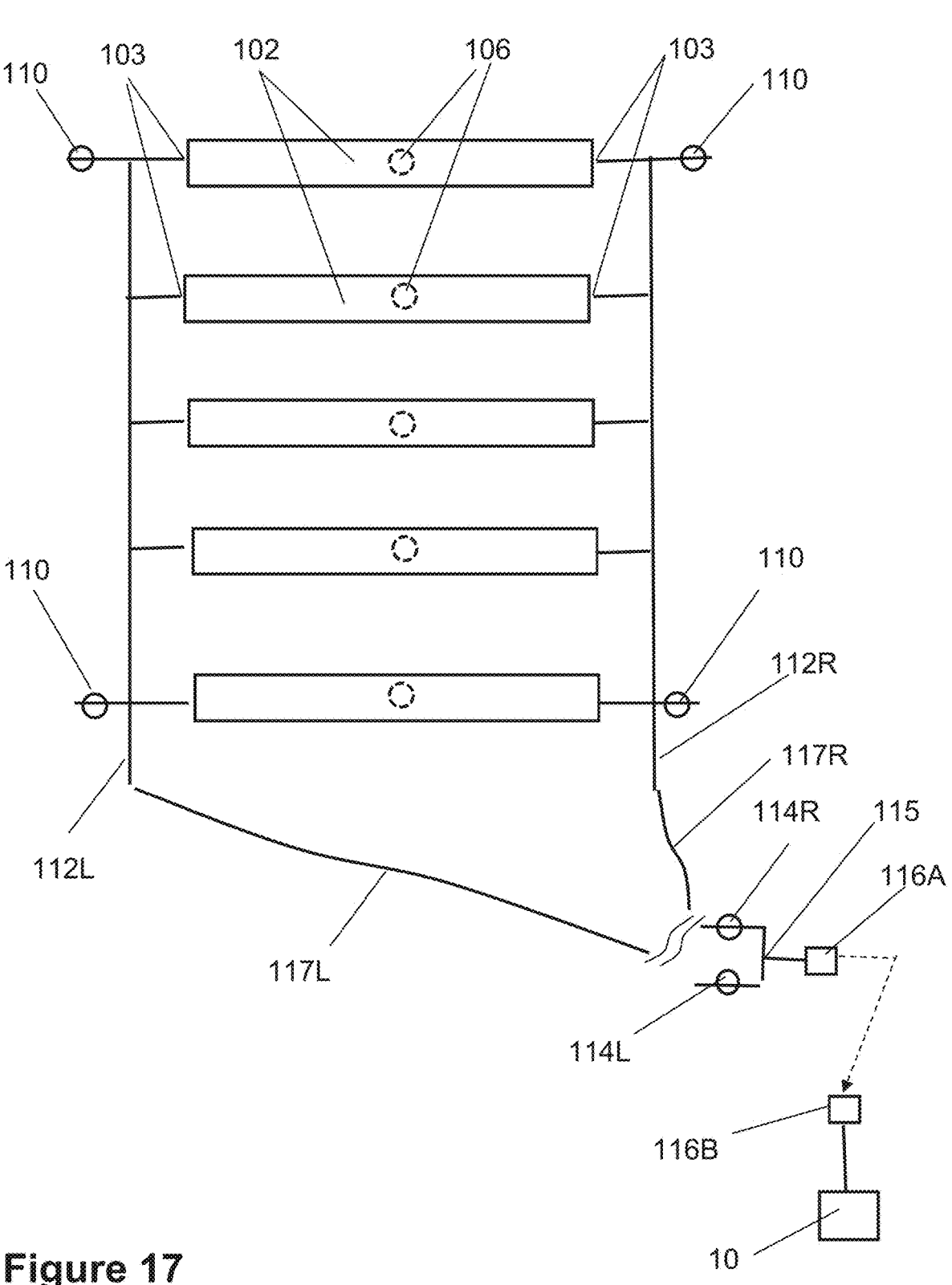
FIG. 17 is a simplified block diagram illustrating in a top view another modification of the bottom air conduit system of the variable buoyancy platform according to an embodiment.

Further alternatively, each of the air supply conduits 112L and 112R is connected to a respective air supply line 117. The end portion of each air supply line 117, the air supply valves 114L and 114R, the combining element 115, and the air supply connecting element 116A are mounted to the floating device such as, for example, buoy 122, as illustrated in FIG. 17. Using the air supply valves 114L and 114R the operator is enabled to individually control the provision of the pressurized air to the left hand side air supply conduit 112L and the right hand side air supply conduit 112R in order to balance the platform 100 while the same is raised from the seafloor 14.

Figure 18:
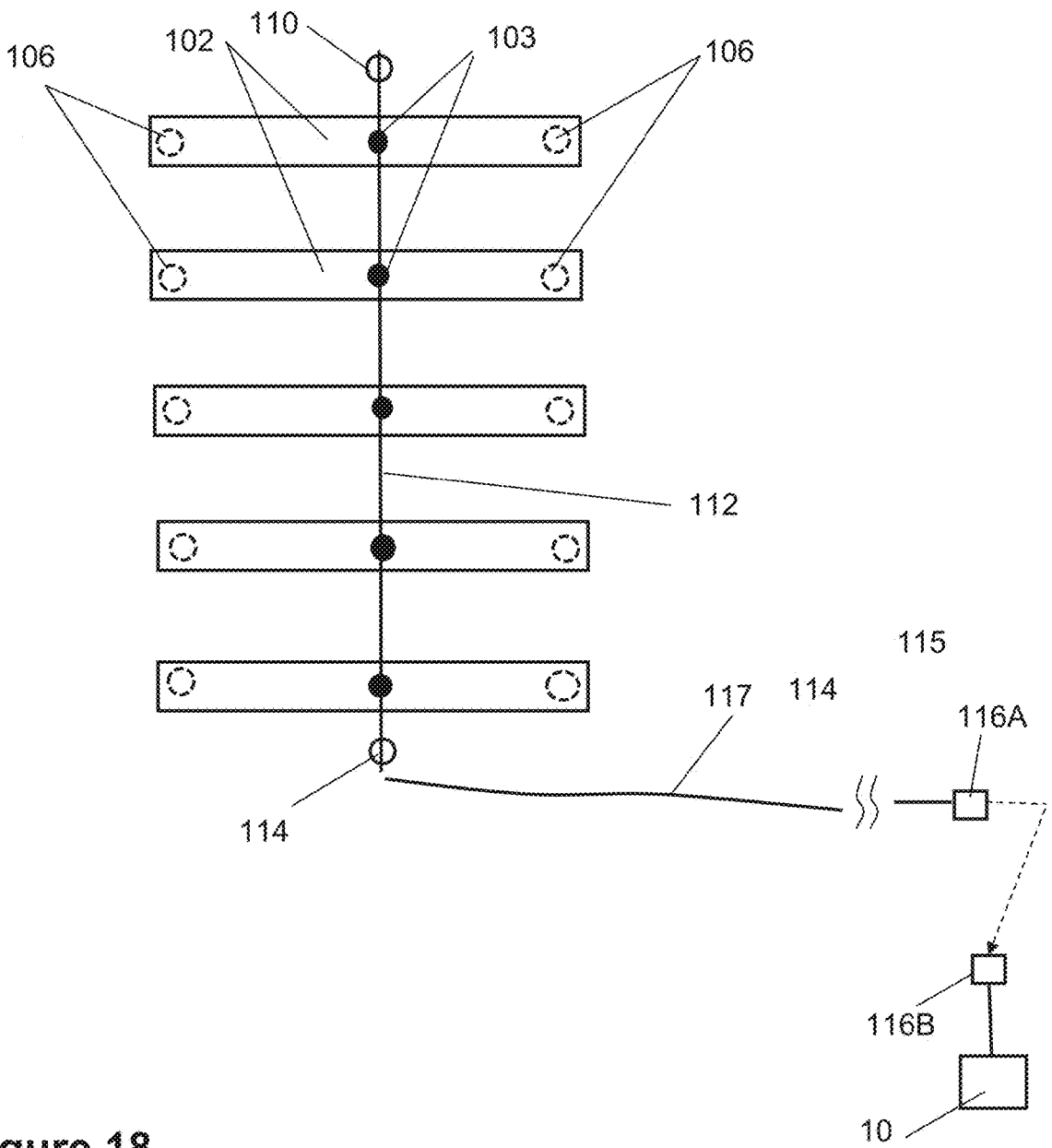
FIG. 18 is a simplified block diagram illustrating in a top view another bottom air conduit system of the variable buoyancy platform according to an embodiment.

Further alternatively, each bottom pontoon 102 comprises only one bottom pontoon air conduit port 103 placed in proximity to a center top of the bottom pontoon 102 and two openings 106 placed in proximity to the first and the second bottom end of the bottom pontoon 102, as illustrated in FIG. 18. Air supply conduit 112 is connected to the bottom pontoon air conduit ports 103 of the bottom pontoons 102. The air supply conduit 112 is connected to air supply valve 114 and air supply connecting element 116A in a similar manner as described hereinabove.

Again, the bottom air supply conduit system can comprise at least a bottom pontoon air valve 110 for controlling air flow therethrough and, in particular, for selectively blocking or enabling egress of pressurized air from the bottom pontoons 102 to the outside as will be described hereinbelow. As is evident to a person of skill in the art, different numbers of bottom pontoon air valves 110 may be employed and/or the bottom pontoon air valves 110 may be placed at different locations of the bottom air supply conduit system depending on design preferences.

The bottom pontoon air supply conduit system and the top pontoon air system are, in one case, implemented using commercially available ProPEX® piping and fittings in combination with commercially available manually operated shut-off valves, substantially facilitating installation and reducing cost, but is not limited thereto and a person skilled in the art may employ different piping and fittings depending on design preferences.

Figure 20:
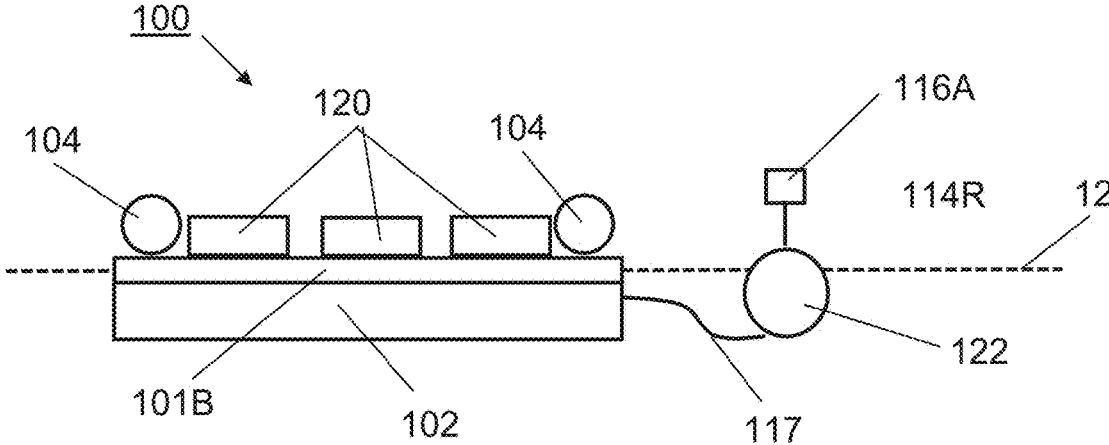
FIG. 20 is a simplified block diagram illustrating in front view the variable buoyancy platform according to an embodiment in a raised mode of operation.
Figure 21:
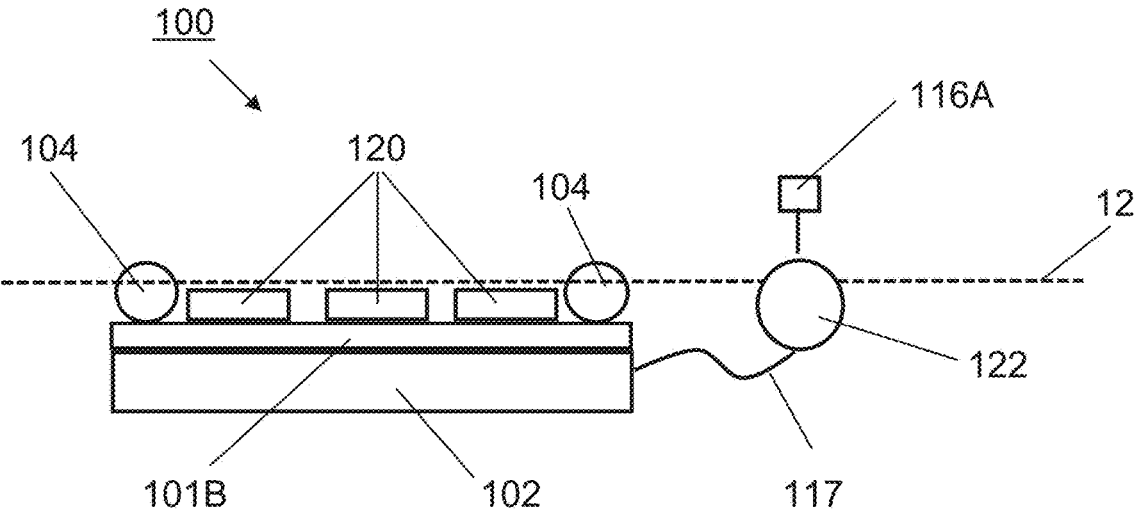
FIG. 21 is a simplified block diagram illustrating in front view the variable buoyancy platform according to an embodiment in a growing mode of operation.

The platform 100 can be adapted for enabling three positions thereof for oyster farming, as illustrated in FIGS. 19 to 21:

sunken position (for winter hibernation or in adverse weather conditions during the growing season) with the bottom pontoons 102 of the platform 100 resting on the seafloor 14 and the air supply connecting element 116A disposed above the water level 12, as illustrated in FIG. 19;

growing position during the growing season with the platform 100 being raised such that the compartments 120 are placed below the water surface 12 in close proximity thereto, as illustrated in FIG. 21, with the platform being kept in this position for several weeks; and, raised position during the growing season (for killing fouling in time intervals of several weeks) with the platform 100 being raised such that the compartments 120 are placed above the water surface 12, as illustrated in FIG. 20, with the platform kept in this position for 24 hrs to 48 hrs.

In the three positions of the platform 100 the respective positions of the air supply valves 114L, 114R, the top pontoon air valves 108, and the bottom pontoon air valves 110 are as follows:

in the sunken position the air supply valves 114L, 114R are open, the top pontoon air valves 108 are open, and the bottom pontoon air valves 110 are closed;

in the growing position the air supply valves 114L, 114R are closed, the top pontoon air valves 108 are closed, and the bottom pontoon air valves 110 are closed; and, in the raised position the air supply valves 114L, 114R are closed, the top pontoon air valves 108 are closed, and the bottom pontoon air valves 110 are closed.

For raising the platform 100 from the sunken position to the growing position (typically in early spring) the following steps are performed:

mating the air supply connecting element 116A with the respective air supply connecting element 116B connected to the pressurized air supply 10;

providing pressurized air to the bottom pontoons 102;

displacing the water in the bottom pontoons 102 until the platform 100 is in the raised position with a top of the support frame 101 being above a water level 12 surrounding the platform (while, optionally, controlling the airflow with the air supply valves 114L, 114R such that the platform remains substantially level);

closing the air supply valves 114L, 114R;

disconnecting the air supply connecting element 116A from the air supply connecting element 116B;

releasing the water from the top pontoons 104 with the top pontoon air valves 108 being open for enabling ingress of ambient air into the top pontoons 104;

closing the top pontoon air valves 108 after the water has been released from the top pontoons 104;

opening the bottom pontoon air valves 110 enabling water to flow into the bottom pontoons 102 and causing the platform to sink; and, closing the bottom pontoon air valves 110 when the platform is in the growing position.

For raising the platform 100 from the growing position to the raised position the following steps are performed:

mating the air supply connecting element 116A with the respective air supply connecting element 116B connected to the pressurized air supply 10;

opening the air supply valves 114L, 114R;

providing pressurized air to the bottom pontoons 102;

displacing the water in the bottom pontoons 102 until the platform 100 is in the raised position with a top of the support frame 101 being above a water level 12 surrounding the platform (while, optionally, controlling the airflow with the air supply valves 114L, 114R such that the platform remains substantially level);

closing the air supply valves 114L, 114R;

disconnecting the air supply connecting element 116A from the air supply connecting element 116B;

releasing the water from the top pontoons 104 with the top pontoon air valves 108 being open for enabling ingress of ambient air into the top pontoons 104; and, closing the top pontoon air valves 108 after the water has been released from the top pontoons 104.

For lowering the platform 100 from the raised position to the growing position the following steps are performed:

opening the bottom pontoon air valves 110 enabling water to flow into the bottom pontoons 102 and causing the platform to sink; and, closing the bottom pontoon air valves 110 when the platform is in the growing position.

For lowering the platform 100 from the growing position to the sunken position the following steps are performed:

opening the air supply valves 114L, 114R enabling water to flow into the bottom pontoons 102 and causing the platform to sink; and, opening the top pontoon air valves 108 enabling water to flow into the top pontoons 104 and causing the platform to sink.

In the example implementation of the platform 100, as illustrated in FIGS. 1 to 10, the support frame 101 was made of U-shaped aluminum profiles having the dimensions D1×D2 of 15'×12'. The longitudinal beams 101A have the dimensions of 12'×16"×1.844" with a thickness of 0.25", and the transverse beams 101B have the dimensions of 15'×3"× 1.5" with a thickness of 3⁄16". The pontoons 102 and 104 have an outside diameter of 14" and an inside diameter of 12". The bottom pontoons 102 are spaced apart a distance D3 of 30.5". The air supply conduits 112L, 112R and the air supply line 117 have an inside diameter of 1", while the connections to the pontoons have an inside diameter of 0.5".

As is evident to those skilled in the art, the platform 100 maybe provided having different overall dimensions, different dimensions of its components, different shapes of the support frame 101 and the pontoons 102, 104, as well as different numbers of pontoons 102, 104, depending on design preferences.

The cost effectiveness and the simplicity of operating the platform 100 enable large scale aquaculture farming. For example, a plurality (e.g. dozens or hundreds) of the platforms 100, with each platform having, for example, a size of 15 feet×12 feet, may be anchored in shallow waters having a depth between 6 feet and 15 feet with the platforms 100 being spaced apart approximately 8-10 feet for enabling easy access of each platform 100 by boat.

The present invention has been described herein with regard to certain embodiments. However, it will be obvious to persons skilled in the art that a number of variations and modifications can be made without departing from the scope of the invention as described herein.

What is claimed is:

1. A variable buoyancy platform comprising:

a support frame;

a plurality of bottom pontoons fixedly mounted to a bottom side of the support frame, each bottom pontoon comprising at least an opening disposed in a bottom portion thereof and at least a bottom pontoon air conduit port disposed in a top portion thereof;

a plurality of top pontoons immovably and rigidly attached to a top side of the support frame, each top pontoon comprising at least an opening disposed in a bottom portion thereof and at least a top pontoon air conduit port disposed in a top portion thereof;

a bottom air supply conduit system connected to the at least a bottom pontoon air conduit port of each bottom pontoon, the bottom air supply conduit system comprising at least a air supply valve for controlling air flow therethrough and a connector adapted for being connected to a pressurized air supply; and, at least a top pontoon air valve directly connected to the at least a top pontoon air conduit port of each top pontoon at a first end thereof and directly connected to outside at a second end thereof, the at least a top pontoon air valve for selectively blocking or enabling ingress of ambient air into each top pontoon or egress of air from each top pontoon to the outside.

2. The platform according to claim 1 wherein each bottom pontoon and each top pontoon comprises an elongated body having two end walls at a first end and a second end thereof.

3. The platform according to claim 2 wherein each bottom pontoon has the at least an opening disposed in a bottom portion of the elongated body in proximity to a center location between the first end and the second end thereof and wherein each bottom pontoon comprises a first bottom pontoon air conduit port disposed in proximity to the first end and a second bottom pontoon air conduit port disposed in proximity to the second end.

4. The platform according to claim 3 wherein the bottom air supply conduit system comprises:

a first air supply conduit connected to the first bottom pontoon air conduit ports and a second air supply conduit connected to the second bottom pontoon air conduit ports;

a combining element connected to the first air supply conduit and the second air supply conduit for combining the first air supply conduit and the second air supply conduit; and wherein the at least an air supply valve is interposed between the combining element and the connector for controlling air flow therethrough.

5. The platform according to claim 4 wherein the first air supply conduit and the second air supply conduit each comprise at least a bottom pontoon air valve directly connected to outside for selectively blocking or enabling egress of pressurized air from the bottom pontoons.

6. The platform according to claim 3 wherein the bottom air supply conduit system comprises:

a first air supply conduit connected to the first bottom pontoon air conduit ports and a second air supply conduit connected to the second bottom pontoon air conduit ports;

a combining element connected to the first air supply conduit and the second air supply conduit for combining the first air supply conduit and the second air supply conduit; and wherein the at least an air supply valve comprises a first air supply valve interposed between the first bottom pontoon air conduit ports and the combining element for controlling air flow therethrough and a second air supply valve interposed between the second bottom pontoon air conduit ports and the combining element for controlling air flow therethrough.

7. The platform according to claim 6 wherein the first air supply conduit and the second air supply conduit each comprise at least a bottom pontoon air valve directly connected to outside for selectively blocking or enabling egress of pressurized air from the bottom pontoons.

8. The platform according to claim 2 wherein each top pontoon has the at least an opening disposed in a bottom portion of the elongated body in proximity to a center location between the first end and the second end thereof and wherein each top pontoon comprises a first top pontoon air conduit port disposed in proximity to the first end and a second top pontoon air conduit port disposed in proximity to the second end.

9. The platform according to claim 2 wherein the support frame is substantially flat and wherein a longitudinal axis of each of the bottom pontoons and the top pontoons is oriented substantially parallel to the support frame.

10. The platform according to claim 9 wherein the longitudinal axis of each of the bottom pontoons is oriented substantially perpendicular to a longitudinal axis of the support frame and wherein the longitudinal axis of each of the top pontoons is oriented substantially parallel to the longitudinal axis of the support frame.

11. The platform according to claim 1 wherein the bottom air supply conduit system comprises at least a bottom pontoon air valve directly connected to outside for selectively blocking or enabling egress of pressurized air from the bottom pontoons.

12. A method of operating a variable buoyancy platform comprising:

providing the variable buoyancy platform, the platform comprising:

a support frame;

a plurality of bottom pontoons fixedly mounted to a bottom side of the support frame, each bottom pontoon comprising at least an opening disposed in a bottom portion thereof and at least a bottom pontoon air conduit port disposed in a top portion thereof;

a plurality of top pontoons immovably and rigidly attached to a top side of the support frame, each top pontoon comprising at least an opening disposed in a bottom portion thereof and at least a top pontoon air conduit port disposed in a top portion thereof;

a bottom air conduit system connected to the at least a bottom pontoon air conduit port of each bottom pontoon, the bottom air conduit system comprising at least an air supply valve for controlling air flow therethrough and a connector adapted for being connected to a pressurized air supply; and, at least a top pontoon air valve directly connected to the at least a top pontoon air conduit port of each top pontoon at a first end thereof and directly connected to outside at a second end thereof, the at least a top pontoon air valve for selectively blocking or enabling ingress of ambient air into each top pontoon or egress of air from each top pontoon to the outside;

when the platform is in a sunken position, connecting the connector to a pressurized air supply and providing pressurized air to the bottom pontoons;

displacing water in the bottom pontoons until the platform is in a raised position with a top of the support frame being above a water level surrounding the platform;

closing the at least a pressurized air valve;

disconnect the connector; and, releasing water from the top pontoons with the at least a top pontoon air valve being open for enabling ingress of ambient air into the top pontoons.

13. The method according to claim 12 comprising:

closing the at least a top pontoon air valve; and enabling water to flow into the bottom pontoons until the platform is lowered to a growing position with the top pontoons being partially submerged.

14. The method according to claim 13 comprising:

opening the at least a top pontoon air valve; and enabling water to flow into the top pontoons causing the platform to sink.

15. The method according to claim 14 comprising opening the at least an air supply valve.

16. The method according to claim 13 comprising:

displacing water in the bottom pontoons until the platform is in the raised position with the top of the support frame being above the water level surrounding the platform; and enabling water to flow out of the top pontoons with the at least a top pontoon air valve being open for enabling ambient air flow into the top pontoons.

17. The method according to claim 13 comprising:

opening at least a bottom pontoon air valve of the bottom air conduit system for releasing the pressurized air disposed in the bottom pontoons; and closing the at least a bottom pontoon air valve when the platform is in the growing position.

18. The method according to claim 12 comprising:

providing pressurized air flow through a first air conduit of the bottom air conduit system connected to first bottom pontoon air conduit ports disposed in proximity to a first end of the bottom pontoons;

providing pressurized air flow through a second air conduit of the bottom air conduit system connected to second bottom pontoon air conduit ports disposed in proximity to a second end of the bottom pontoons; and controlling provision of the pressurized air flow through the first air conduit and the second air conduit such that the platform is substantially balanced when lifted from the sunken position to the raised position.

\*    \*    \*    \*    \*